United States Patent
Hearn et al.

(10) Patent No.: US 9,073,140 B2
(45) Date of Patent: Jul. 7, 2015

(54) SYSTEM AND METHODS PROVIDING MODULATION SCHEMES TO AFFECT HEAT INPUT TO A WELD

(71) Applicant: Lincoln Global, Inc., City of Industry, CA (US)

(72) Inventors: James E. Hearn, Brunswick, OH (US); Joseph A. Daniel, Sagamore Hills, OH (US); Tamara Savrin, Orange Village, OH (US); Steven R. Peters, Huntsburg, OH (US); Daniel P. Fleming, Painesville, OH (US); Judah Benjamin Henry, Geneva, OH (US)

(73) Assignee: Lincoln Global, Inc., City of Industry, CA (US)

( * ) Notice: Subject to any disclaimer, the term of this patent is extended or adjusted under 35 U.S.C. 154(b) by 335 days.

(21) Appl. No.: 13/777,385

(22) Filed: Feb. 26, 2013

(65) Prior Publication Data

US 2014/0131322 A1    May 15, 2014

Related U.S. Application Data

(60) Provisional application No. 61/724,666, filed on Nov. 9, 2012.

(51) Int. Cl.
| | |
|---|---|
| *B23K 9/095* | (2006.01) |
| *B23K 9/173* | (2006.01) |
| *B23K 9/16* | (2006.01) |
| *B23K 9/32* | (2006.01) |
| *B23K 9/10* | (2006.01) |

(52) U.S. Cl.
CPC . *B23K 9/16* (2013.01); *B23K 9/095* (2013.01); *B23K 9/325* (2013.01); *B23K 9/1043* (2013.01); *B23K 9/173* (2013.01)

(58) Field of Classification Search
CPC ........ B23K 9/095; B23K 9/1043; B23K 9/16; B23K 9/173; B23K 9/325
See application file for complete search history.

(56) References Cited

U.S. PATENT DOCUMENTS

| | | | | |
|---|---|---|---|---|
| 4,912,299 | A | * | 3/1990 | Oros et al. ...................... 219/74 |
| 5,440,099 | A | * | 8/1995 | Smith .............................. 219/74 |
| 6,495,798 | B1 | | 12/2002 | Enyedy |
| 6,653,594 | B2 | * | 11/2003 | Nakamura et al. .............. 219/74 |
| 7,385,158 | B2 | | 6/2008 | Briand et al. |

(Continued)

FOREIGN PATENT DOCUMENTS

| | | | | |
|---|---|---|---|---|
| RU | 2012461 | C1 | * | 5/1994 |
| RU | 2051773 | C1 | * | 1/1996 |

(Continued)

*Primary Examiner* — Geoffrey S Evans
(74) *Attorney, Agent, or Firm* — Hahn, Loeser & Parks LLP (57) ABSTRACT

Systems and methods to affect heat input to a weld and, therefore, an appearance of a deposited weld bead by modulating a mixing ratio of shielding gases and/or one or more welding parameters. For example, a mixing ratio of two different shielding gases from two sources of shielding gases may be modulated to affect the appearance of a deposited weld bead. The modulation frequency may be based on a selected travel speed of a welding tool. Furthermore, a wire feed speed of a welding electrode may be synergistically modulated with the shielding gases to affect a deposited weld bead appearance. Other welding parameters may be synergistically modulated with the shielding gases to affect a deposited weld bead appearance.

10 Claims, 8 Drawing Sheets

(56) References Cited

U.S. PATENT DOCUMENTS

| | | |
|---|---|---|
| 8,129,652 B2 | 3/2012 | Hampton |
| 8,158,905 B2 | 4/2012 | Khakhalev et al. |
| 2004/0188403 A1* | 9/2004 | Kuiper et al. .................... 219/74 |
| 2008/0053965 A1* | 3/2008 | Laymon et al. ................. 219/74 |
| 2009/0026397 A1* | 1/2009 | Evers ....................... 251/129.04 |
| 2009/0065489 A1 | 3/2009 | Duffy |
| 2009/0107959 A1* | 4/2009 | Khakhalev et al. ............. 219/74 |
| 2009/0107960 A1* | 4/2009 | Hampton ........................ 219/74 |
| 2009/0152251 A1 | 6/2009 | Dantinne et al. |
| 2012/0118865 A1* | 5/2012 | Stava et al. ............... 219/130.31 |

FOREIGN PATENT DOCUMENTS

| | | |
|---|---|---|
| WO | 01/81036 A1 | 11/2001 |
| WO | 2004/065054 A1 | 8/2004 |
| WO | WO-2010/023555 A2 * | 3/2010 |

* cited by examiner

SYSTEM AND METHODS PROVIDING MODULATION SCHEMES TO AFFECT HEAT INPUT TO A WELD

This U.S. patent application claims priority to and the benefit of U.S. provisional patent application Ser. No. 61/724,666 filed on Nov. 9, 2012, which is incorporated herein by reference in its entirety.

TECHNICAL FIELD

Certain embodiments of the present invention relate to arc welding. More particularly, certain embodiments of the present invention relate to systems and methods providing for the modulation of one or more welding parameters to affect heat input to a weld.

BACKGROUND

Certain prior art welding systems use limited techniques and/or rely on the welding operator to achieve a desired weld bead appearance of a weld. As a result, the ability to consistently achieve a desired weld bead appearance may be restricted and may require significant training and experience of the welder.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

In certain welding applications (e.g., MIG welding of aluminum), it may be desirable to modulate the heat input to a weld to affect an appearance of a weld bead. For example, a stacked dime appearance of a weld bead is well known in the art and may provide enhanced metallurgical characteristics such as, for example, reduced porosity and improved grain structure. However, the ability to create such a stacked dime appearance is not always straightforward, and may require much skill and experience by the welder. Systems and methods providing for the modulation of a shielding gas mixture and/or one or more welding parameters to affect heat input to a weld and, consequently, a weld bead appearance (e.g., a stacked dime appearance) are disclosed. For example, the mixing ratio of two or more shielding gases may be modulated to achieve the desired weld bead appearance.

In one embodiment of the present invention, an arc welding system for generating an arc between a consumable welding electrode and a welding workpiece is provided. The arc welding system includes a welding power source, two or more sources of shielding gases, and a gas mixing device operatively connected to the two or more sources of shielding gases and the welding power source. The gas mixing device is configured to mix the shielding gases from the two or more sources of shielding gases to achieve a mixing ratio as commanded by the welding power source. The welding power source is configured to command the gas mixing device to modulate the mixing ratio at a modulation frequency to temporally affect heat input to a weld produced by the arc welding system during a welding process. Temporally affecting heat input to a weld may include cycling between a first heat input state and a second heat input state providing more heat than the first heat input state. The shielding gases may include at least two of argon, helium, carbon dioxide, hydrogen, oxygen, and nitrogen. The welding process may be an aluminum or an aluminum alloy gas metal arc welding (GMAW) process, for example, using argon and helium.

In one embodiment of the present invention, an arc welding system for generating an arc between a consumable welding electrode and a welding workpiece is provided. The arc welding system includes a welding power source, two or more sources of shielding gases, and a gas mixing device operatively connected to the two or more sources of shielding gases and the welding power source. The gas mixing device is configured to mix the shielding gases from the two or more sources of shielding gases to achieve a mixing ratio as commanded by the welding power source. The welding power source is configured to command the gas mixing device to modulate the mixing ratio and a welding parameter in a correlated manner to temporally affect heat input to a weld produced by the arc welding system during a welding process. The welding parameter may include one of an electrode negative portion of a cyclical welding output current waveform, an electrode positive portion of a cyclical welding output current waveform, a wire feed speed of the consumable welding electrode, or a welding output current waveform type. Temporally affecting heat input to a weld may include cycling between a first heat input state and a second heat input state providing more heat than the first heat input state. The shielding gases may include at least two of argon, helium, carbon dioxide, hydrogen, oxygen, and nitrogen. The welding process may be an aluminum or an aluminum alloy gas metal arc welding (GMAW) process, for example. A frequency of modulation of the mixing ratio may increase as the wire feed speed increases.

In one embodiment of the present invention, an arc welding system for generating an arc between a consumable welding electrode and a welding workpiece is provided. The arc welding system includes a welding power source, a welding tool to accept a fed wire consumable welding electrode, two or more sources of shielding gases, and a gas mixing device operatively connected to the two or more sources of shielding gases and the welding power source. The gas mixing device is configured to mix the shielding gases from the two or more sources of shielding gases to achieve a mixing ratio as commanded by the welding power source. The welding power source is configured to command the gas mixing device to modulate the mixing ratio based on a selected travel speed of the welding tool to temporally affect heat input to a weld produced by the arc welding system during a welding process. A frequency of modulation of the mixing ratio may increase as the travel speed increases. Temporally affecting heat input to a weld may include cycling between a first heat input state and a second heat input state providing more heat than the first heat input state. The shielding gases may include at least two of argon, helium, carbon dioxide, hydrogen, oxygen, and nitrogen. The welding process may be an aluminum or an aluminum alloy gas metal arc welding (GMAW) process, for example.

In one embodiment of the present invention, an arc welding system for generating an arc between a consumable welding electrode and a welding workpiece is provided. The arc welding system includes a welding power source and two or more sources of shielding gases. Each source of shielding gas has an outlet valve, where at least one of the outlet valves is operable by a solenoid. The outlet valves are connected to a common outlet hose. The welding power source is configured to trigger the one or more solenoids to open and close corresponding outlet valves to modulate a mixing ratio of the shielding gases. The triggering of the one or more solenoids may be accomplished via pulse width modulation. The shielding gases may include at least two of argon, helium, carbon dioxide, hydrogen, oxygen, and nitrogen. The modulated mixing ratio may temporally affect heat input to a weld produced by the arc welding system during an arc welding process. Temporally affecting heat input to a weld may include cycling between a first heat input state and a second heat input state providing more heat than the first heat input state. The welding process may be an aluminum or an aluminum alloy gas metal arc welding (GMAW) process, for example.

Details of illustrated embodiments of the present invention will be more fully understood from the following description and drawings.

DETAILED DESCRIPTION

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that may guide a consumable welding electrode to a workpiece, provide a delivery system and diffuser for dispersing a shielding gas, and/or provide for applying electrical power (from a welding power source) to the welding wire.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

The term "welding parameter" is used broadly herein and may refer to characteristics of a portion of a welding output current waveform (e.g., amplitude, pulse width or duration, slope, electrode polarity), a welding process (e.g., a short arc welding process or a pulse welding process), wire feed speed, a modulation frequency, or a welding travel speed.

The terms "modulation" and "modulate" as used herein may refer to the modification of, the changing of, or the varying of a welding parameter or a mixing ratio of gases at a defined rate or frequency with a defined duty cycle.

The term "energy output state" is from the point of view of a welding power source and the term "energy input state" is from the point of view of a weld, as used herein, even though the terms may be essentially equivalent and used interchangeably herein. The term "heat input state", as used herein, refers to a portion of a welding process where a determined amount of heat is input to a weld.

Figure 1:
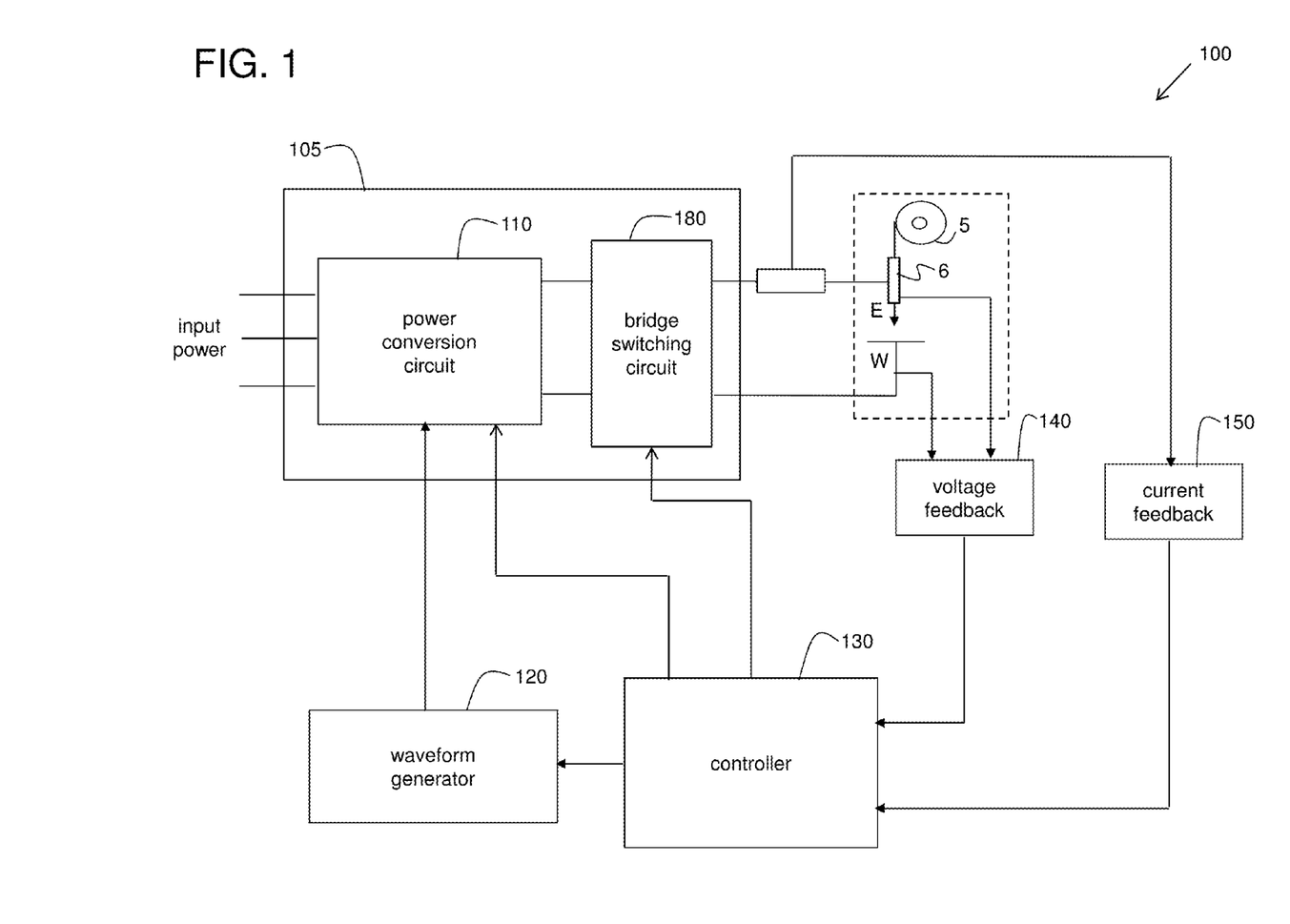
FIG. 1 illustrates a schematic block diagram of an exemplary embodiment of an arc welding system operatively connected to a consumable welding electrode and a workpiece.

FIG. 1 illustrates a schematic block diagram of an exemplary embodiment of an arc welding system 100 operatively connected to a consumable welding electrode and a workpiece. The system 100 includes a switching power supply 105 having a power conversion circuit 110 and a bridge switching circuit 180 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. The switching power supply 105 also includes a bridge switching circuit 180 that is operatively connected to the power conversion circuit 110 and is configured to switch a direction of the polarity of the welding output current (e.g., for AC welding).

The system 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W. The controller 130 also commands the switching of the bridge switching circuit 180 and may provide control commands to the power conversion circuit 110 during a welding process.

The system 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect operation of the system 100, for example. In accordance with an embodiment, the controller 130 is used to control a modulation frequency at which one or more welding parameters are varied to affect an appearance of a deposited weld bead from the consumable welding electrode onto the workpiece.

In accordance with an embodiment, the switching power supply 105, the waveform generator 120, the controller 130, the voltage feedback circuit 140, and the current feedback circuit 150 constitute a welding power source of the system 100. The system 100 also includes a wire feeder 5 that feeds the consumable wire welding electrode E toward the workpiece W through a welding tool 6. The wire feeder 5, the welding tool 6, the consumable welding electrode E, and the workpiece W are not part of the welding power source but may be operatively connected to the welding power source 100 via one or more welding output cables.

Figure 2:
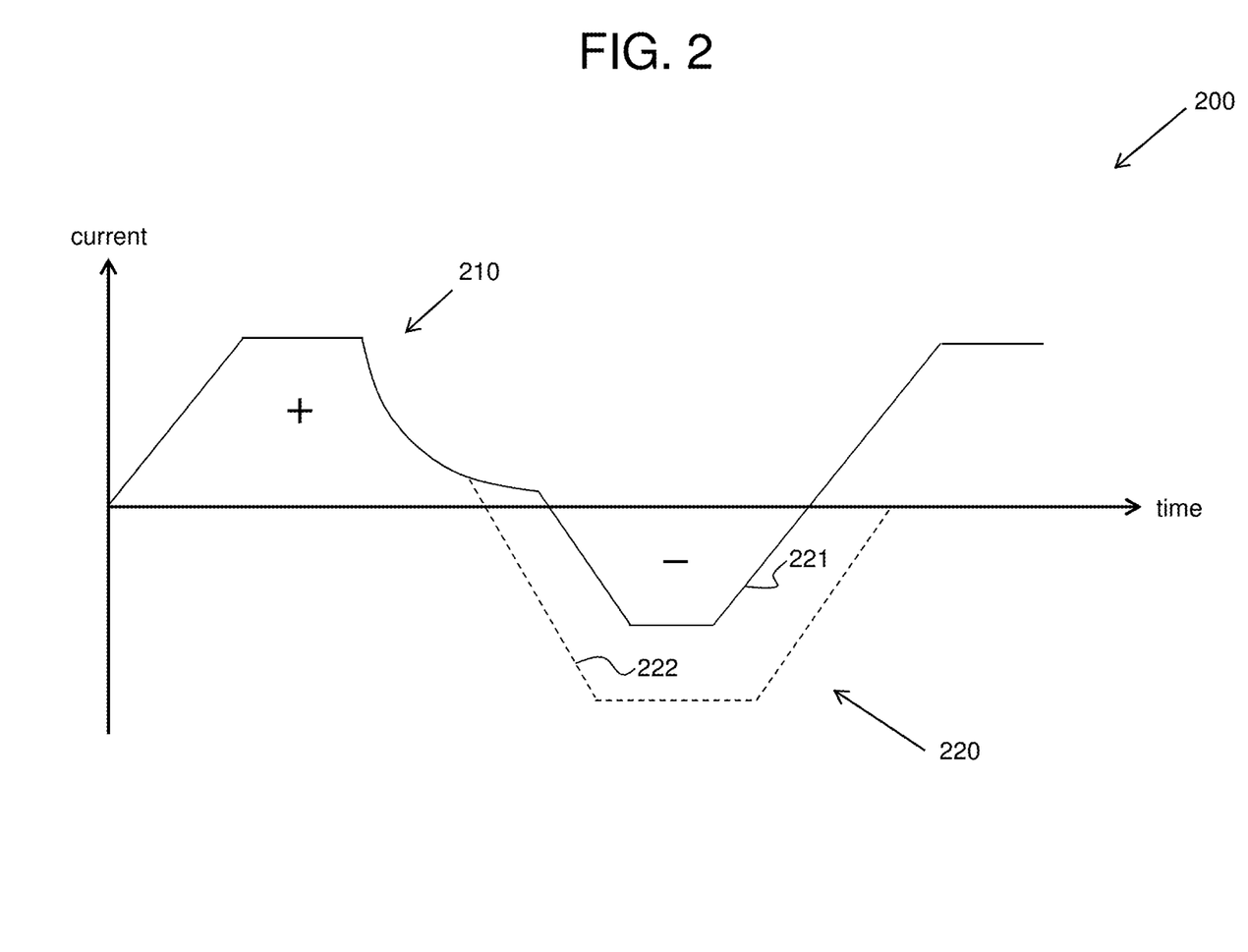
FIG. 2 illustrates an exemplary embodiment of a welding output current waveform having an electrode positive portion and a modulated electrode negative portion for affecting an appearance of a deposited weld bead.

FIG. 2 illustrates an exemplary embodiment of an AC welding output current waveform 200 having an electrode positive portion 210 and a modulated electrode negative portion 220 for affecting an appearance of a deposited weld bead. Under the command of the controller 130, the electrode negative portion of the waveform 200 may be varied between a lower energy output state 221 and a higher energy output state 222. For example, the electrode negative portion 220 providing the lower energy output state 221 may be produced for x consecutive waveform cycles (e.g., ten waveform cycles) followed by the higher energy output state 222 for y consecutive waveform cycles (e.g., five waveform cycles). The process repeats at some defined modulation rate. Therefore, the electrode negative portion 220 is changed back and forth between low energy and high energy states at the modulation rate.

Figure 8:
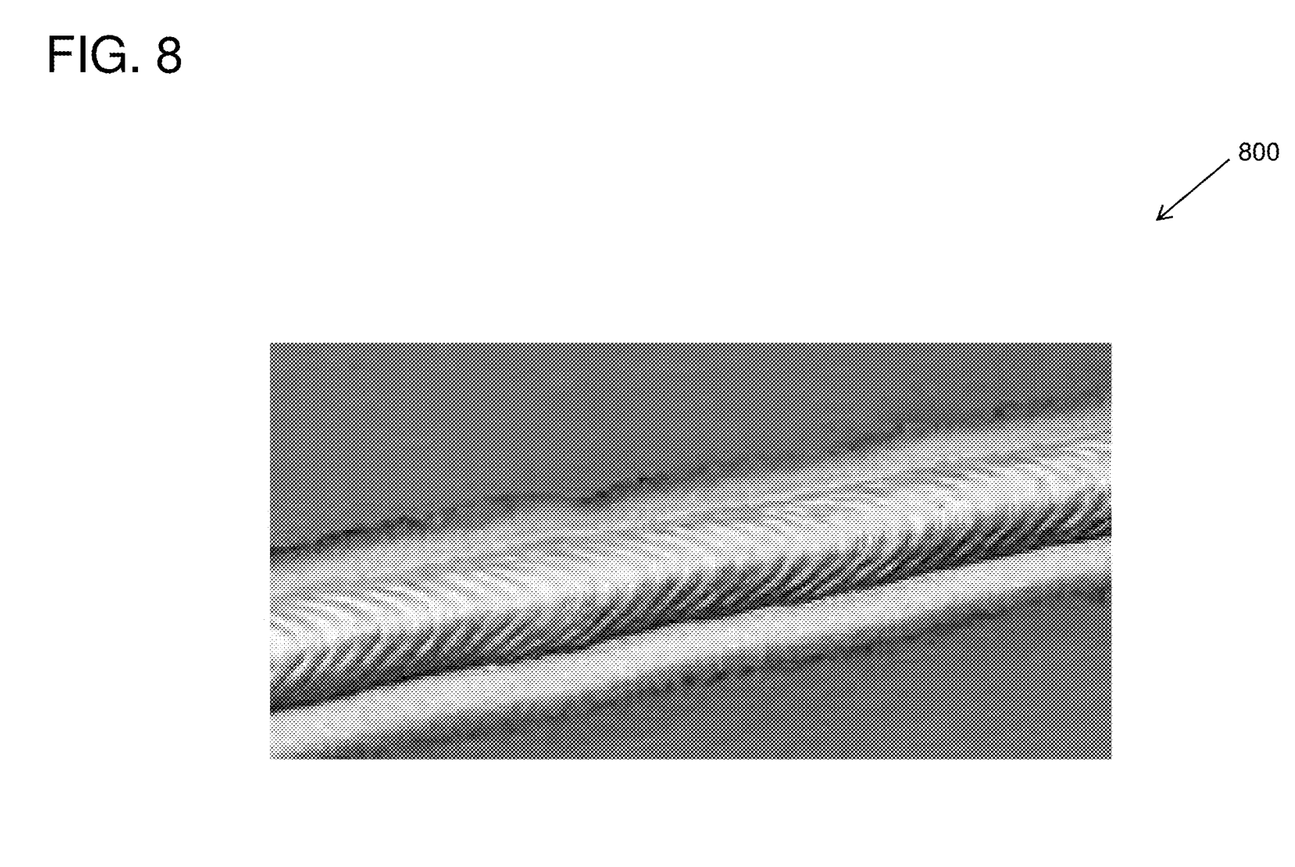
FIG. 8 illustrates an example of an aluminum weld bead having a stacked dime appearance.

The melting rate of the electrode weld material changes as the ratio of electrode positive energy to electrode negative energy changes by modulating the electrode negative energy. For example, the wire electrode E may melt faster during the electrode negative portion of the welding output current waveform 200. Such modulation of the electrode negative portion of the welding output current may result in a desired deposited weld bead appearance (e.g., a stacked dime appearance when the welding application is an aluminum or aluminum alloy MIG welding application). FIG. 8 illustrates an example of an aluminum weld bead 800 having a stacked dime appearance.

The electrode negative portion 220 of the welding output current waveform 200 may be modulated in various ways. In FIG. 2, the amplitude and duration or pulse width of the electrode negative portion 220 is varied. Other parameters or characteristics may also be varied such as, for example, the falling and rising slopes of the electrode negative portion 220, or the overall shape of the electrode negative portion 220.

Figure 3:
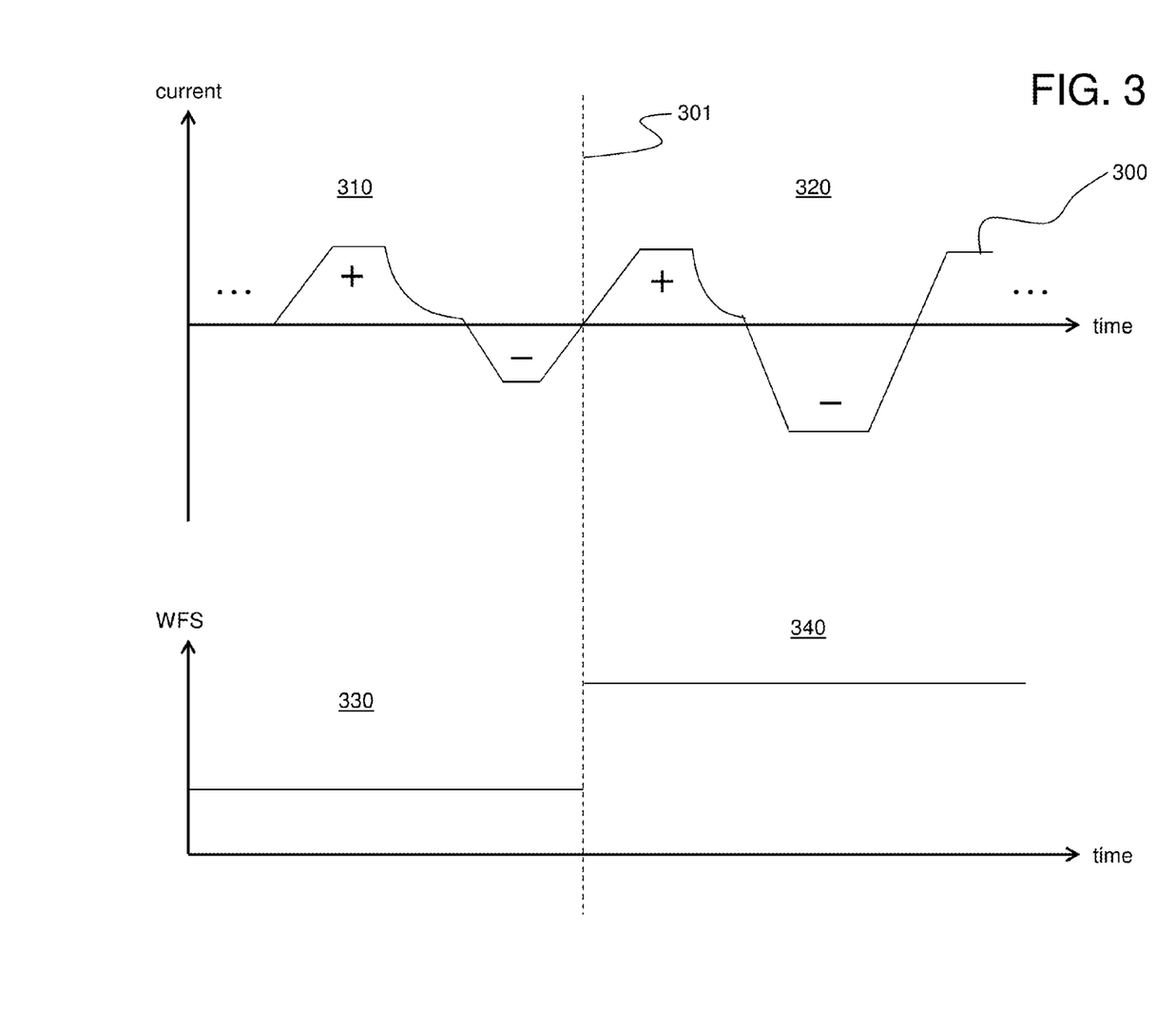
FIG. 3 illustrates an exemplary embodiment of synergistically modulating wire feed speed and a welding output current waveform to affect an appearance of a deposited weld bead.

FIG. 3 illustrates an exemplary embodiment of synergistically modulating wire feed speed and a welding output current waveform to affect an appearance of a deposited weld bead. The top portion of FIG. 3 shows the transition 301 between waveform cycles of a welding output current 300 having a low energy electrode negative portion 310 and waveform cycles of the welding output current 300 having a high energy electrode negative portion 320. That is, the electrode negative portion of the welding output current 300 is modulated at some defined modulation rate. The lower portion of FIG. 3 shows the transition 301 between a low wire feed speed portion 330 and a high wire feed speed portion 340 of the welding electrode wire E as fed by the wire feeder 5. That is, the wire feed speed is modulated at some defined modulation rate (the process repeats at the modulation rate).

In accordance with an embodiment, the low wire feed speed portion 330 is correlated to the low energy electrode negative portion 310 of the welding output current 300, and the high wire feed speed portion 340 is correlated to the high energy electrode negative portion 320 of the welding output current 300. Therefore, the modulation rate of the welding output current 300 and the wire feed speed are the same and in synchronization. Such modulation of the electrode negative portion 310 of the welding output current 300 and the wire feed speed may result in a desired deposited weld bead appearance (e.g., a stacked dime appearance when the welding application is an aluminum or aluminum alloy MIG welding application; e.g., see the stacked dime bead appearance of FIG. 8).

Figure 4:
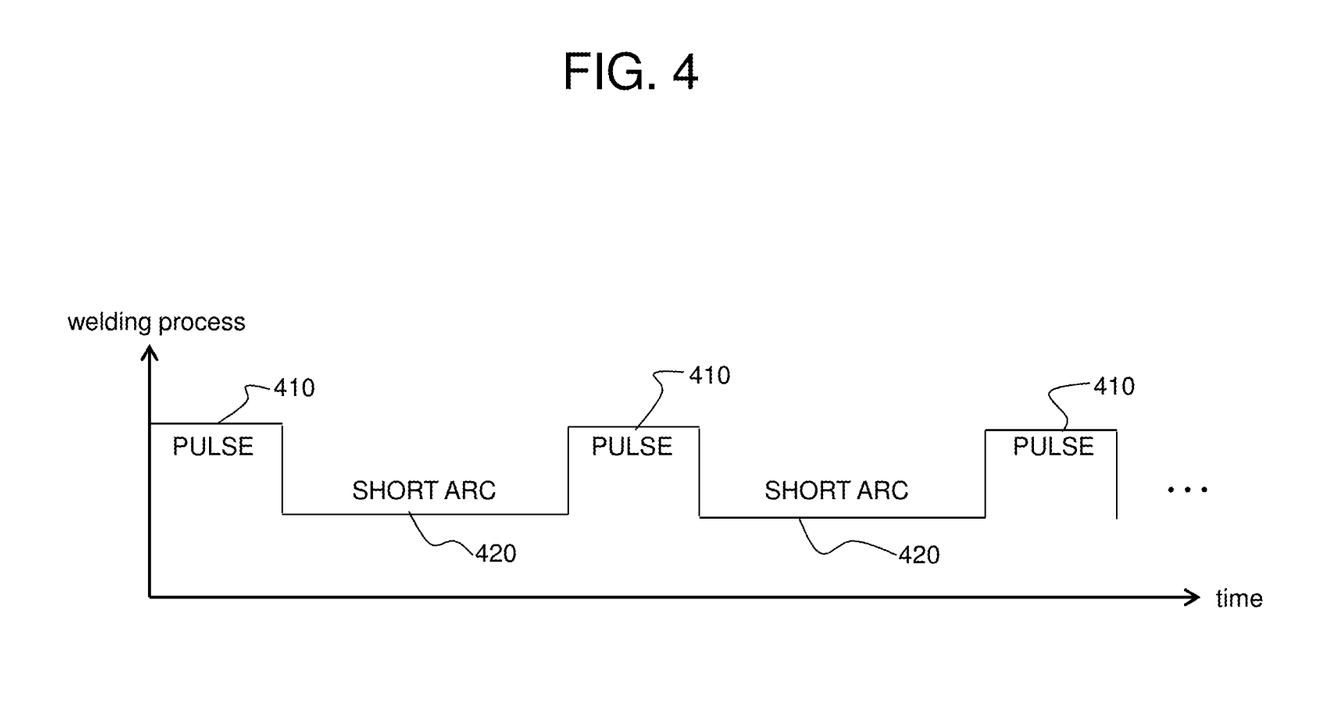
FIG. 4 illustrates an exemplary embodiment of cycling between two welding processes to affect an appearance of a deposited weld bead.

FIG. 4 illustrates an exemplary embodiment of cycling between two welding processes to affect an appearance of a deposited weld bead. For example, in FIG. 4, the welding process cycles between cycles (e.g., ten cycles) of a pulse welding process 410 and cycles (e.g., fifteen cycles) of a short arc welding process 420 at some defined modulation rate. Pulse welding processes and short arc welding processes are well known in the art. The cycling between the two welding processes at the modulation rate is under the control of the controller 130, in accordance with an embodiment. The pulse welding process 410 may provide a high heat transfer of welding droplets across the arc between the electrode E and the workpiece W. The short arc welding process 420 may provide a low heat transfer of welding droplets from the electrode E to the workpiece W by shorting the electrode E to the workpiece W. The modulation rate may be controlled to control the resultant heat input into the weld. Such modulation of welding processes may result in a desired deposited weld bead appearance (e.g., a stacked dime appearance when the welding application is a silicon bronze or aluminum MIG welding application). Other low heat and high heat welding processes may be cycled between as well, in accordance with other embodiments.

Figure 5:
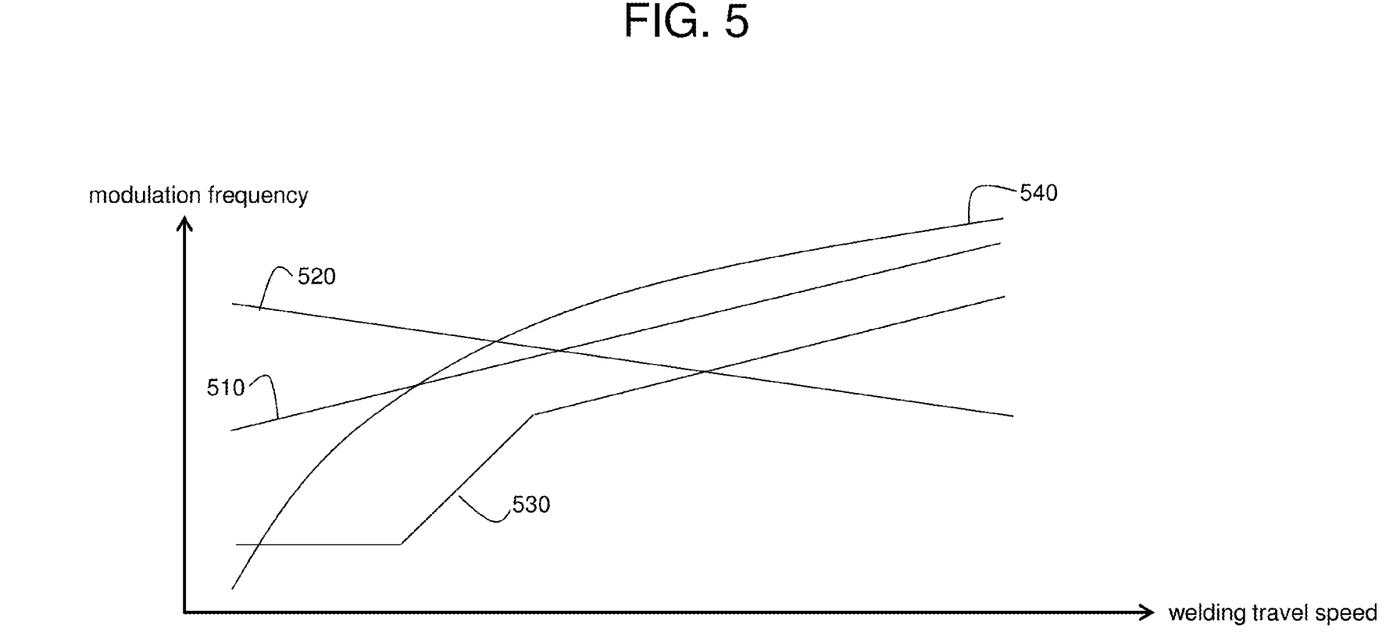
FIG. 5 illustrates an exemplary embodiment of how a welding power source may adjust a modulation frequency of one or more welding parameters based on a welding travel speed to achieve a consistent appearance of a deposited weld bead.

FIG. 5 illustrates an exemplary embodiment of how a welding power source may adjust a modulation rate or frequency of one or more welding parameters based on a welding travel speed to achieve a consistent appearance of a deposited weld bead. Welding travel speed corresponds to the speed that a welder (or mechanized device) moves a welding tool along a weld path to deposit a weld bead from a consumable electrode. The one or more welding parameters being modulated may include, for example, a electrode negative portion of a welding output current (e.g., amplitude and duration), a wire feed speed, or a welding process (e.g., short arc and pulse). Other welding parameters may be possible to modulate as well, in accordance with various embodiments.

As an example, modulation frequency may vary directly and linearly with respect to welding travel speed as shown in graph 510 of FIG. 5. Alternatively, modulation frequency may vary inversely and linearly with respect to welding travel speed as shown in graph 520 of FIG. 5. As another example, modulation frequency may vary in a piece-wise linear manner with respect to welding travel speed as shown in graph 530 of FIG. 5. As a final example, modulation frequency may vary non-linearly with respect to welding travel speed as shown in graph 540 of FIG. 5. In accordance with an embodiment, two or more welding parameters may be correlated or synchronized to each other, varying in accordance with the same modulation frequency.

Such varying of the modulation frequency of one or more welding parameters as welding travel speed changes may result in a consistent deposited weld bead appearance (e.g., a stacked dime appearance when the welding application is a nickel or nickel alloy MIG welding application). Other relationships between modulation frequency and welding travel speed are possible as well, in accordance with other embodiments.

Systems and methods for affecting an appearance of a deposited weld bead by modulating one or more welding parameters are disclosed. For example, an electrode negative portion of a welding output current may be modulated to affect the appearance of a deposited weld bead. Furthermore, a wire feed speed of a welding electrode may be synergistically modulated with an electrode negative portion of a welding output current to affect a deposited weld bead appearance. Two or more welding processes may be interleaved with each other at a specified modulation frequency to affect a deposited weld bead appearance. One or more welding parameters may be modulated based on a welding travel speed to provide a consistent appearance of a deposited weld bead.

In accordance with an embodiment, shielding gases are used during a gas metal arc welding (GMAW) process to protect the welding region from atmospheric gases such as oxygen or nitrogen, for example. Although there may be situations where it is desirable to use oxygen or nitrogen in combination with other gases for shielding. Such atmospheric gases may cause various weld metal defects such as, for example, fusion defects, embrittlement, and porosity. The type of shielding gas, or combination of shielding gases used depends on the material being welded and the welding process. The rate of flow of the shielding gas to be provided depends on the type of shielding gas, the travel speed, the welding current, the weld geometry, and the metal transfer mode of the welding process. Inert shielding gases include argon and helium. However, there may be situations when it is desirable to use other shielding gases or combinations of gases such as, for example, carbon dioxide ($CO_2$), hydrogen, oxygen, and nitrogen. In accordance with an embodiment, a shielding gas may be fed to a welding tool during an arc welding process such that the welding tool disperses the shielding gas to the weld region during the welding process. The shielding gas or gases used during a welding process may affect the heat input to a weld. Such affect on heat input may be exploited by various embodiments of the present invention to affect weld bead appearance.

Figure 6:
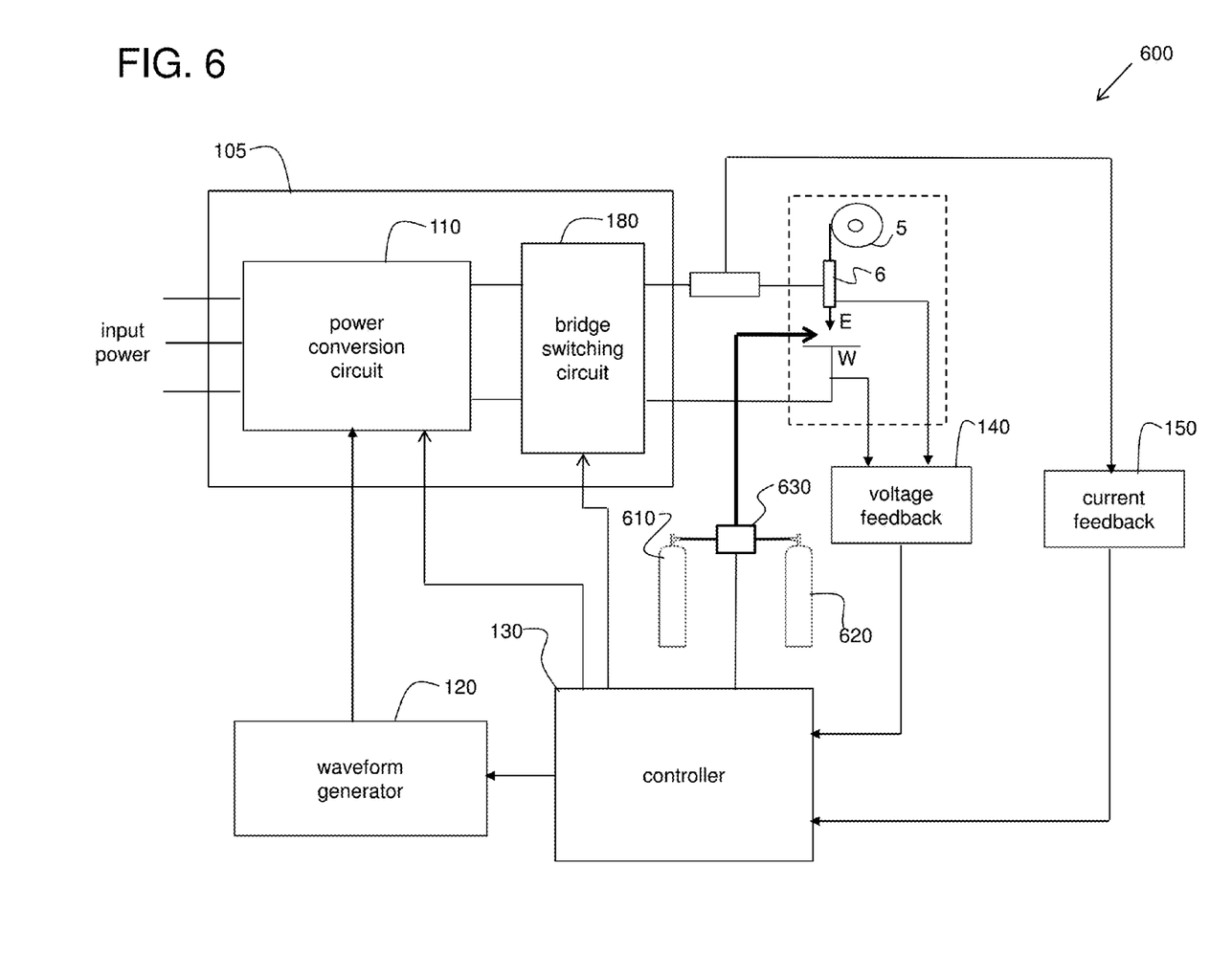
FIG. 6 illustrates a schematic block diagram of a second exemplary embodiment of an arc welding system operatively connected to a consumable welding electrode and a workpiece.

FIG. 6 illustrates a schematic block diagram of a second exemplary embodiment of an arc welding system 600 operatively connected to a consumable welding electrode E and a workpiece W. The system 600 is very similar to the system 100 of FIG. 1. However, the system 600 includes a first source of shielding gases 610 and a second source of shielding gases 620. The sources of shielding gases may be cylindrical metal containers having output valves, for example. The first source of shielding gases 610 may contain, for example, argon gas. The second source of shielding gases 620 may contain, for example, helium gas. Other types of shielding gases are possible as well such as, for example, carbon dioxide, hydrogen, nitrogen, and oxygen.

The system 600 also includes a gas mixing device 630 connected to the outputs (e.g., output valves) of the sources of shielding gases 610 and 620. In accordance with an embodiment, the gas mixing device 630 is a digitally controlled device that takes in the gases provided by the sources of shielding gases 610 and 620 and mixes the gases together to form a mixing ratio of the gases. For example, if source 610 provides argon gas and source 620 provides helium gas, the gas mixing device 630 may be set to mix the gases to provide a mixing ratio of 75% argon and 25% helium. In accordance with an embodiment, the controller 130 of the welding power source provides a signal to the gas mixing device 630, commanding the mixing ratio. The mixture of gases may then be fed to a welding tool during a welding process to provide shielding as described above.

In accordance with an embodiment, the controller 130 of the welding power source may be configured (e.g., programmed) to modulate the mixing ratio during a welding process. For example, the controller 130 may command the gas mixing device 130 to provide a mixing ratio of 100% argon for x cycles (e.g., 15 cycles) of a welding process followed by a mixing ratio of 50% argon and 50% helium for y cycles (e.g., 10 cycles) of the welding process in a repeating manner. Such modulation of the mixing ratio during a welding process affects the heat input to the weld as a function of time (i.e., temporally) and may result in creating a particular appearance of the resultant weld bead (e.g., a stacked dime appearance). Different frequencies of modulation may be provided for different welding processes to result in particular desired weld bead appearances for those welding processes.

Figure 7:
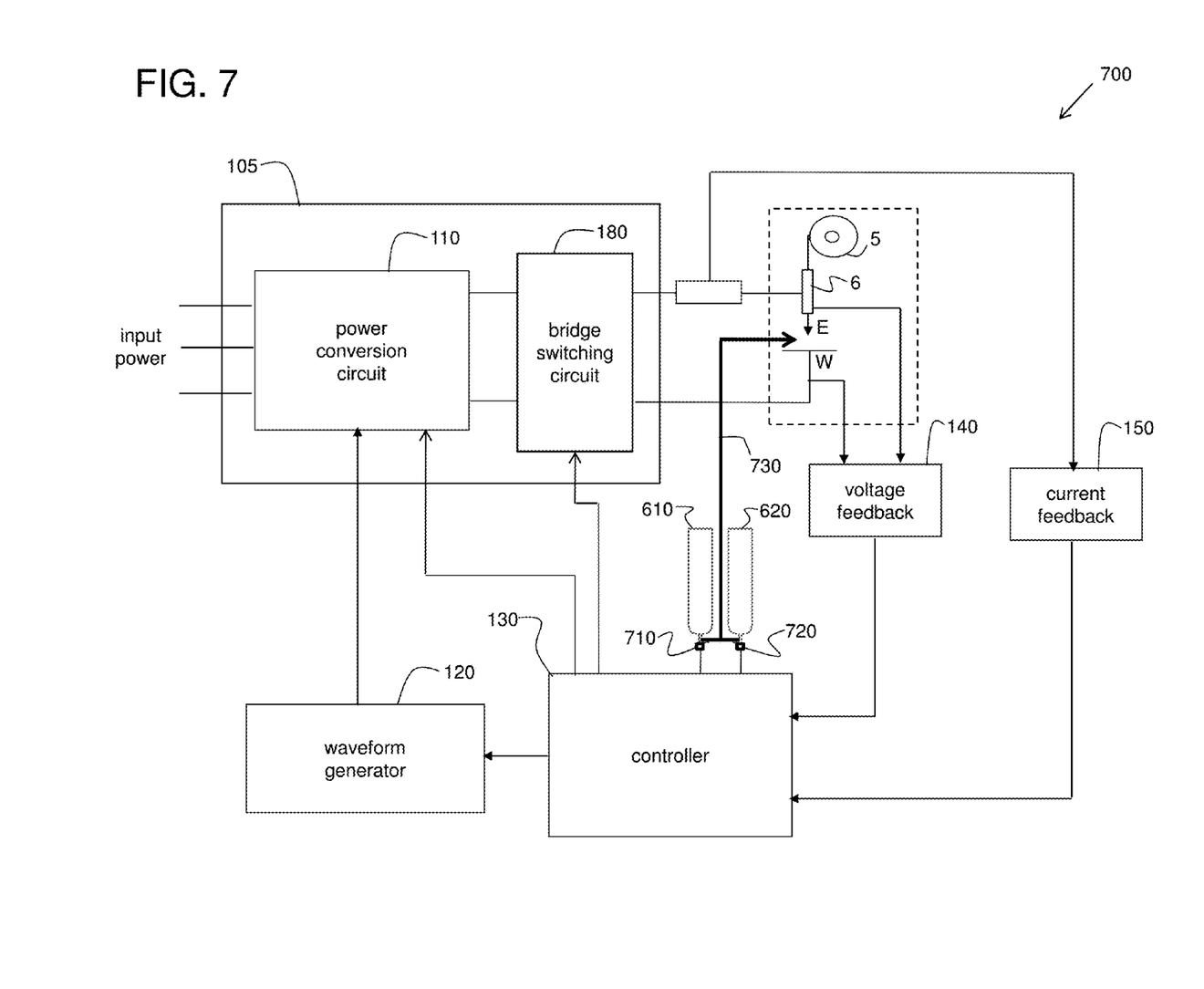
FIG. 7 illustrates a schematic block diagram of a third exemplary embodiment of an arc welding system operatively connected to a consumable welding electrode and a workpiece.

FIG. 7 illustrates a schematic block diagram of a third exemplary embodiment of an arc welding system 700 operatively connected to a consumable welding electrode E and a workpiece W. The system 700 is similar to the system 600 of FIG. 6 except that the system 700 does not include a gas mixing device 630. Furthermore, each of the sources of shielding gases 610 and 620 include an outlet valve operable by a solenoid 710 and 720, respectively. The outlet valves are connected to a common outlet hose 730, such that gases from the sources of shielding gases 610 and 620 mix in the common outlet hose 730.

The controller 130 of the welding power source is configured to trigger each solenoid of the sources of shielding gases to open and close each corresponding outlet valve to modulate a mixing ratio of the shielding gases at a modulation rate. In accordance with an embodiment, the controller 130 provides a pulse width modulated (PWM) signal to each of the solenoids to open and close the valves in a repeated manner at some pulse width modulation frequency and duty cycle. The PWM signals to the solenoids may be the same, having the same characteristics, or may be different from each other, having differing characteristics (e.g., differing PWM frequencies or duty cycles), in accordance with various embodiments. The closer to the arc that the modulated gases are mixed, the more pronounced may be the affect of the gas modulation.

The controller 130 is further configured to vary the PWM signals to modulate a resultant mixing ratio of the shielding gases. For example, the controller 130 may provide PWM signals that result in a mixing ratio of 98% argon and 2% $CO_2$ for x cycles of a welding process followed by a mixing ratio of 90% argon and 10% $CO_2$ for y cycles of the welding process in a repeating manner. Such modulation of the mixing ratio during a welding process affects the heat input to the weld as a function of time (i.e., temporally) and may result in creating a desired appearance and quality of the resultant weld bead. Different rates of mixing ratio modulation may be provided for different welding processes to result in particular desired weld bead appearances for those welding processes. It should be understood, however, that the PWM frequencies of the PWM signals are not the same as the modulation rate of the mixing ratio. Instead, in accordance with an embodiment, the frequencies of the PWM signals applied to the solenoids of the sources of shielding gases affect the modulation rate of the mixing ratio.

In accordance with an alternative embodiment, a first source of shielding gases may contain two gases mixed according to a defined mixing ratio (e.g., 90% argon and 10% $CO_2$). A second source of shielding gases may contain only $CO_2$ and may have a solenoid operatively connected to control an output valve of the second source. During a welding process, the first source may constantly provide the defined mixing ratio (e.g., 90% argon and 10% $CO_2$), and the solenoid of the second source may be periodically triggered to provide additional $CO_2$ to change the mixing ratio (e.g., change the mixing ratio to 75% argon and 25% $CO_2$) in accordance with a modulation rate. In such an alternative embodiment, the first source of shielding gases may not have a solenoid controlling an output valve. Such an alternative embodiment may be used when welding, for example, mild steel.

In accordance with other embodiments, more than two sources of shielding gases may be provided and mixed together, in accordance with the techniques described herein, to provide mixing ratios having more than two components. For example, three sources of shielding gases providing argon gas, $CO_2$ gas, and helium gas may be mixed and modulated under the control of the controller of the welding power source using the system 600 of FIG. 6 or the system 700 of FIG. 7. In accordance with an embodiment, this may result in a mixing ratio of 94% argon, 3% $CO_2$ and 3% helium for x cycles of a welding process followed by a mixing ratio of 85% argon, 10% $CO_2$ and 5% helium for y cycles of the welding process in a repeating manner.

Furthermore, the modulation frequency of the mixing ratio may be dependent on a selected travel speed of a welding tool, in accordance with an embodiment. For example, as the selected travel speed is increased, the modulation frequency of the mixing ratio may be increased. Also, a welding parameter (e.g., an electrode negative portion of a cyclical welding output current waveform, an electrode positive portion of a cyclical welding output current waveform, a wire feed speed of the consumable welding electrode, or a welding output current waveform type) may be modulated along with the mixing ratio in a correlated manner to temporally affect heat input to a weld.

Systems and methods to affect heat input to a weld and, therefore, an appearance of a deposited weld bead by modulating a mixing ratio of shielding gases and/or one or more welding parameters are disclosed. For example, a mixing ratio of two different shielding gases from two sources of shielding gases may be modulated to affect the appearance of a deposited weld bead. The modulation frequency may be based on a selected travel speed of a welding tool. Furthermore, a wire feed speed of a welding electrode may be synergistically modulated with the shielding gases to affect a deposited weld bead appearance. Other welding parameters may be synergistically modulated with the shielding gases to affect a deposited weld bead appearance.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. An arc welding system for generating an arc between a consumable welding electrode and a welding workpiece, the system comprising:
    a welding power source;
    a welding tool to accept a fed wire consumable welding electrode;
    two or more sources of shielding gases; and
    a gas mixing device operatively connected to the two or more sources of shielding gases and the welding power source, and configured to mix the shielding gases from the two or more sources of shielding gases to achieve a mixing ratio commanded by the welding power source,
    wherein the welding power source is configured to command the gas mixing device to modulate the mixing ratio based on a selected travel speed of the welding tool to temporally affect heat input to a weld produced by the arc welding system during an arc welding process.

2. The system of claim 1, wherein a frequency of modulation of the mixing ratio increases as the travel speed increases.

3. The system of claim 1, wherein temporally affecting heat input to a weld includes cycling between a first heat input state and a second heat input state providing more heat than the first heat input state.

4. The system of claim 1, wherein the shielding gases include at least two of argon, helium, carbon dioxide, hydrogen, oxygen, and nitrogen.

5. The system of claim 1, wherein the welding process comprises an aluminum or an aluminum alloy gas metal arc welding (GMAW) process.

6. An arc welding system for generating an arc between a consumable welding electrode and a welding workpiece, the system comprising:
    a welding power source;
    two or more sources of shielding gases;
    a gas mixing device operatively connected to the two or more sources of shielding gases and the welding power source, and configured to mix the shielding gases from the two or more sources of shielding gases to achieve a mixing ratio commanded by the welding power source,
    wherein the welding power source is configured to command the gas mixing device to modulate the mixing ratio and a welding parameter in a correlated manner to temporally affect heat input to a weld produced by the arc welding system during an arc welding process;
    wherein the welding parameter is a wire feed speed of the consumable welding electrode; and
    wherein a frequency of modulation of the mixing ratio increases as the wire feed speed increases.

7. The system of claim 6, wherein temporally affecting heat input to a weld includes cycling between a first heat input state and a second heat input state providing more heat than the first heat input state.

8. The system of claim 6, wherein the welding process comprises an aluminum or an aluminum alloy gas metal arc welding (GMAW) process.

9. The system of claim 6, wherein the welding parameter further includes one of an electrode negative portion of a cyclical welding output current waveform, an electrode positive portion of a cyclical welding output current waveform, or a welding output current waveform type.

10. The system of claim 6, wherein the shielding gases include at least two of argon, helium, carbon dioxide, hydrogen, oxygen, and nitrogen.

* * * * *